(12) United States Patent
Roitshtein

(10) Patent No.: US 9,118,576 B2
(45) Date of Patent: Aug. 25, 2015

(54) NETWORK DEVICE WITH A PROGRAMMABLE CORE

(75) Inventor: Amir Roitshtein, Holon (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 628 days.

(21) Appl. No.: 13/344,429

(22) Filed: Jan. 5, 2012

(65) Prior Publication Data

US 2012/0177047 A1    Jul. 12, 2012

Related U.S. Application Data

(60) Provisional application No. 61/466,718, filed on Mar. 23, 2011, provisional application No. 61/430,413, filed on Jan. 6, 2011.

(51) Int. Cl.
| | | |
|---|---|---|
| H04L 12/56 | (2006.01) | |
| H04L 12/933 | (2013.01) | |
| H04L 29/06 | (2006.01) | |

(52) U.S. Cl.
CPC ........ *H04L 49/1523* (2013.01); *H04L 49/1546* (2013.01); *H04L 69/12* (2013.01); *H04L 69/22* (2013.01)

(58) Field of Classification Search
CPC . H04L 49/1523; H04L 49/1546; H04L 69/12; H04L 69/22
See application file for complete search history.

(56) References Cited

U.S. PATENT DOCUMENTS

| | | | |
|---|---|---|---|
| 5,325,358 A * | 6/1994 | Goeldner | 370/219 |
| 5,404,352 A * | 4/1995 | Pauwels et al. | 370/390 |
| 6,731,644 B1 | 5/2004 | Epps et al. | |
| 7,643,486 B2 | 1/2010 | Belz et al. | |
| 7,706,363 B1 * | 4/2010 | Daniel et al. | 370/389 |
| 7,869,432 B1 | 1/2011 | Mollyn | |
| 8,514,723 B2 | 8/2013 | Malomsoky et al. | |
| 2003/0231625 A1 | 12/2003 | Calvignac et al. | |
| 2004/0071142 A1 * | 4/2004 | Moriwaki et al. | 370/392 |

(Continued)

FOREIGN PATENT DOCUMENTS

WO    WO-2005/027433 A1    3/2005

OTHER PUBLICATIONS

IEEE Std 802.1Q, 2003 Edition, "IEEE Standards for Local and Metropolitan area networks—Virtual Bridged Local Area Networks," *The Institute of Electrical and Electronics Engineers, Inc.*, 327 pages (May 7, 2003).

(Continued)

*Primary Examiner* — David Oveissi

(57) ABSTRACT

In network device, a plurality of ports is configured to receive and to transmit packets on a network. A packet processing pipeline includes a plurality of hardware stages, wherein at least one hardware stage is configured to output a data structure comprising a field extracted from a received packet based on a first packet processing operation performed on the packet or the data structure, wherein the data structure is associated with the packet. A configurable processor is coupled to the at least one hardware stage of the packet processing pipeline. The configurable processor is configured to modify the field in the data structure to generate a modified data structure and to pass the modified data structure to a subsequent hardware stage that is configured to perform a second packet processing operation on the data structure using the field modified by the configurable processor.

16 Claims, 7 Drawing Sheets

(56) References Cited

U.S. PATENT DOCUMENTS

| | | | |
|---|---|---|---|
| 2006/0002386 A1 | 1/2006 | Yik et al. | |
| 2006/0251074 A1 | 11/2006 | Solomon | |
| 2007/0098006 A1 | 5/2007 | Parry et al. | |
| 2007/0160042 A1* | 7/2007 | Dollo et al. | 370/389 |
| 2008/0013547 A1 | 1/2008 | Klessig et al. | |
| 2009/0279548 A1* | 11/2009 | Davis et al. | 370/394 |
| 2011/0128974 A1 | 6/2011 | Breslin et al. | |
| 2011/0134925 A1 | 6/2011 | Safrai et al. | |
| 2011/0205959 A1 | 8/2011 | Aalto et al. | |
| 2012/0182866 A1 | 7/2012 | Vinayagam et al. | |
| 2012/0300772 A1 | 11/2012 | Manzella et al. | |
| 2013/0258963 A1 | 10/2013 | Mihaly et al. | |

OTHER PUBLICATIONS

IEEE Std 802.1Q-2011 (Revision of IEEE Std.802.1Q-2005), "IEEE Standard for Local and Metropolitan Area Networks—Media Access Control (MAC) Bridges and Virtual Bridged Local Area Networks," *The Institute of Electrical and Electronics Engineers, Inc.*, 1,365 pages (Aug. 31, 2011).

IEEE P802.1ad/D6.0, Draft Amendment to IEEE Std 802.1Q, "IEEE Draft Standard for Local and Metropolitan Area Networks—Virtual Bridged Local Area Networks—Amendment 4: Provider Bridges," *The Institute of Electrical and Electronics Engineers, Inc.*, 60 pages, (Aug. 17, 2005).

IEEE P802.1aq/D4.6, Draft Amendment to IEEE Std 802.1Q-2011, "IEEE Draft Standard for Local and Metropolitan Area Networks—Media Access Control (MAC) Bridges and Virtual Bridged Local Area Networks—Amendment XX: Shortest Path Bridging," *The Institute of Electrical and Electronics Engineers, Inc.*, 363 pages (Feb. 10, 2012).

IEEE Std 802.3-2005, "IEEE Standard for Information technology—Telecommunications and information exchange between systems—Local and metropolitan area networks—Specific requirements, Part 3: Carrier sense multiple access with collision detection (CSMA/CD) access method and physical layer specifications," *The Institute of Electrical and Electronics Engineers, Inc.*, Sections 1-5 (Dec. 9, 2005).

IEEE Draft P802.3ae/D5.0 Supplement to Carrier Sense Multiple Access with Collision Detection (CSMA/CD) Access Method & Physical Layer Specifications—Media Access Control (MAC) Parameters, Physical Layer, and Management Parameters for 10 Gb/s Operation *The Institute of Electrical and Electronics Engineers, Inc.*, 540 pages (May 1, 2002).

IEEE Std 802.11e/D11.0, "IEEE Standard for Information technology—Telecommunications and information exchange between systems—Local and metropolitan area networks—Specific requirements, Part 11: Wireless Medium Access Control (MAC) and Physical Layer (PHY) Specifications: Amendment 7: Medium Access Control (MAC) Quality of Service (QoS) Enhancements, " *The Institute of Electrical and Electronics Engineers, Inc.*, pp. 1-196 (Oct. 2004).

Office Action in Chinese Application No. 201280002096.4, dated Jul. 3, 2015, with English translation (17 pages).

\* cited by examiner

NETWORK DEVICE WITH A PROGRAMMABLE CORE

CROSS-REFERENCE TO RELATED APPLICATION

This application claims the benefit of U.S. Provisional Patent Application No. 61/430,413, entitled "Programmable Switch," which was filed on Jan. 6, 2011, the entire disclosure of which is hereby incorporated by reference herein.

This application also claims the benefit of U.S. Provisional Patent Application No. 61/466,718, entitled "Programmable Switch," which was filed on Mar. 23, 2011, the entire disclosure of which is hereby incorporated by reference herein.

FIELD OF THE DISCLOSURE

The present disclosure relates generally to communication networks and, more particularly, to network switching devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Network switches are configured to forward network traffic between a plurality of ports connected to communication links. For high throughput applications, network switches are often implemented using hardware such as an application specific integrated circuit (ASIC). When a new networking protocol is introduced and the hardware (e.g., ASIC) of a network switch was designed prior to the introduction of the new networking protocol, the network switch may have difficulty processing packets that conform to the new networking protocol.

SUMMARY

In an embodiment, a network device comprises a plurality of ports configured to receive and to transmit packets on a network, and a packet processing pipeline comprising a plurality of hardware stages. At least one hardware stage is configured to output a data structure comprising a field extracted from a received packet based on a first packet processing operation performed on the packet or the data structure, wherein the data structure is associated with the packet. The network device also comprises a configurable processor coupled to the at least one hardware stage of the packet processing pipeline. The configurable processor is configured to modify the field in the data structure to generate a modified data structure and to pass the modified data structure to a subsequent hardware stage that is configured to perform a second packet processing operation on the data structure using the field modified by the configurable processor.

In another embodiment, a method includes receiving a packet via a port of a network switching device, and processing the packet with a packet processing pipeline comprising a plurality of hardware stages including at least a first stage, a second stage, and a configurable processor. Processing the packet with the packet processing pipeline includes outputting, with the first stage, a data structure comprising a field extracted from a received packet based on a first packet processing operation performed on the packet or the data structure, wherein the data structure is associated with the packet, modifying, with the configurable processor, the field in the data structure to generate a modified data structure, and passing the modified data structure to the second hardware stage, the second hardware stage configured to perform a second packet processing operation on the data structure using the field modified by the configurable processor.

DETAILED DESCRIPTION

Figure 1:
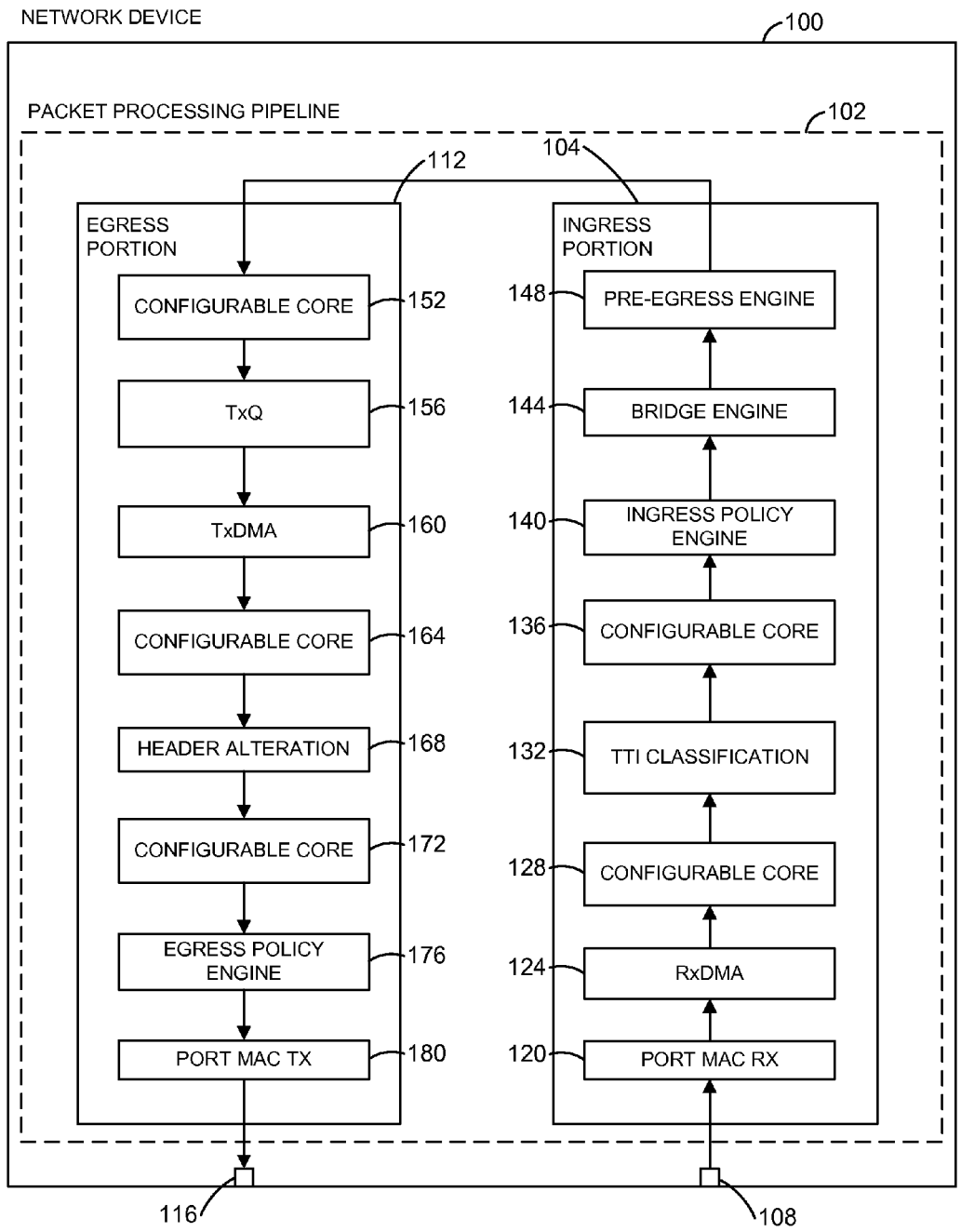
FIG. 1 is a functional diagram of an example network device, in accordance with an embodiment of the disclosure.

FIG. 1 is a block diagram of an example network device 100 configured for processing and forwarding data units, i.e., packets, according to an embodiment. As will be described in more detail below, despite configuration, in an embodiment, as a pipeline of hardware stages or processing engines, the network device 100 includes one or more configurable cores that are intersperse among the various stages of the pipeline. In some embodiments, the one or more configurable cores can be reconfigured at a manufacturing facility, in the field by a user, etc. For example, when a new network communication protocol is introduced, one or more configurable cores can be reconfigured so that the network device 100 can process packets that conform to the new network communication protocol. As another example, one or more configurable cores are reconfigured so that the network device 100 can perform functions that the network device 100 was not previously capable of performing. In some embodiments, the one or more configurable cores can be reconfigured in a manufacturing facility associated with the producer of the network device 100 and/or of hardware (e.g., a packet processor) included in the network device 100. For example, if an integrated circuit (IC) on which a packet processor (or a portion thereof) includes a flaw or there is a design error such that the packet processor does not operate as intended, the manufacturing facility can reconfigure one or more configurable cores, after the IC is already manufactured, to implement a work around so that the packet processor does operate as intended.

In an embodiment, the one or more configurable cores are pipeline units (i.e., hardware stages) included in a packet processing pipeline. In an embodiment, units of the pipeline perform different tasks associated with a packet based on the values of fields within the packet (e.g., header fields) and/or based on a data structure associated with the packet. In an embodiment, such a data structure includes header fields of the packet. In an embodiment, the data structure additionally or alternatively includes other information associated with the packet. For example, the other information may include a value, generated by a first unit of the pipeline, that indicates to a second unit of the pipeline how the packet should be processed by the second unit (e.g., which task or tasks should be performed by the second unit with respect to the packet).

In an embodiment, the one or more configurable cores permit the network device 100 to be configured to perform different functions, appropriately process packets that conform to different or new network protocols, work around errors or flaws in the pipeline, etc. In one embodiment, the one or more configurable cores permit the network device 100, or at least various stages within the network device 100, which is adapted to process packets conforming to a first protocol, to be reconfigured to process packets conforming to a second protocol when many of the pipeline units of the network device 100 are not adapted to process packets conforming to the second protocol. For example, in an embodiment, units of the pipeline process data structures associated with packets and each data structure includes a field that is interpreted by many of the units of the pipeline as corresponding to a first packet header field specified by the first protocol. In an embodiment, one of the configurable cores is configured, e.g., at a manufacturing facility or by a customer, to modify the data structure field based on a second packet header field specified by the second protocol. Other units of the pipeline may then process the data structure using the modified data structure field assuming that the data structure field still corresponds to the first header field specified by the first protocol. In other words, although the packet appears to have data structure fields that are compliant with a first protocol and the packet is processed as if it is compliant with the first protocol, in fact after modification by the configurable core, the actual content of selected fields in the data structure is compliant with a second protocol, in an embodiment. The actual processing of the packet, e.g. making a forwarding decision, is performed according to the second protocol by a processing unit that acts as if it is processing a packet conforming to the first protocol, in an embodiment.

In another embodiment, a first configurable core is configured to set a data structure field based on analysis of the packet. A second configurable core located downstream from the first configurable core is configured to take different actions based on the value of the data structure field. Other pipeline units between the first configurable core and the second configurable core are configured to ignore the data structure field. In an embodiment, a configurable core is configured to set one or more data structure fields based on analysis of the packet, and the one or more data structure fields are utilized by downstream units in the pipeline to determine whether the packet should bypass processing of one or more of the downstream units.

Referring to FIG. 1, the network device 100 includes a packet processing pipeline 102 coupled to one or more ingress physical ports 108 and to one or more egress physical ports 116. Although only one ingress physical port 108 and one physical egress port 116 are illustrated in FIG. 1, a typical switch device includes multiple ingress physical ports 108 via which packets ingress and a plurality of egress physical ports 116 via which packets are egressed from the network device 100. The packet processing pipeline includes an ingress portion 104 coupled to an egress portion 112, in an embodiment. FIG. 1 is a simplified block diagram, and a processing pipeline in a network device typically includes additional units that are not shown in FIG. 1 to improve clarity.

The ingress physical ports 108 and the egress physical ports 116 are coupled to a plurality of communication links, in some embodiments. Typically, there are a plurality of physical ports (ingress and/or egress), and each is coupled to a single, respective communication link. For example, the ingress physical ports 108 and the egress physical ports 116 are coupled to a plurality of different networks and/or to other switches (not shown) in a switching system, in some embodiments. For example, the ingress physical ports 108 and the egress physical ports 116 are coupled to a provider network, to one or more customer networks, and/or to one or more other switches in a switching system, in various embodiments. For purposes of clarity, only one ingress physical port and one egress physical port are seen. In an embodiment the packet processing pipeline 102 is coupled to, and configured to forward packets among, a plurality of physical ports.

In one embodiment, the ingress physical ports 108 and the egress physical ports 116 provide multiple 2-way, point-to-point communication links to other devices, such as bridges, other switches in the switching system, endpoints, etc.

The packet processing pipeline 102 generally transfers packets of data from the ingress physical ports 108 to appropriate egress physical ports 116, in an embodiment. In some embodiments, at least some physical ports are input/output ports, and at least some ingress physical ports 108 and egress physical ports 116 correspond to the same physical ports.

As seen in FIG. 1, the ingress portion 104 and the egress portion 112 each include a plurality of processing units coupled in series. Generally, each unit of a pipeline optionally processes a packet or a data structure (e.g., a packet descriptor) corresponding to the packet and then passes the packet or the data structure to the next unit in the pipeline for further processing. A data structure such as a packet descriptor includes some information from the packet, such as some or all of the header information of the packet, in an embodiment. In some embodiments, the data structure includes other information as well, such as an indicator of where the packet is stored in a memory associated with the network device 100, indications of actions to be taken by one or more units of the pipeline, characteristic information about the packet such as an indicator of a flow to which the packet belongs, etc. For ease of explanation, the term "packet" hereinafter is used to refer to a packet itself or to a data structure associated with the packet. Each unit in the pipeline 102 may or may not process a particular packet. For example, in some instances, a unit simply passes a packet onto the next unit in the pipeline 102. The last unit of the ingress portion 104 passes the packet to the first unit of the egress portion 212, in an embodiment.

Each or at least some of the units of the ingress portion 104 and the egress portion 112 includes, or otherwise is associated with, a corresponding memory, in an embodiment. A packet received by a unit is stored in the memory associated with the unit, in an embodiment. Particular example units of the packet processing pipeline 102 are illustrated in FIG. 1 and are discussed below as an illustrative example. In some embodiments, one or more other suitable units are included in the packet processing pipeline 102. Additionally, in some embodiments, one or more units illustrated in FIG. 1 are omitted from the packet processing pipeline 102.

In the example of FIG. 1, the ingress portion 104 includes a port media access control (MAC) receiver unit 120 coupled to the ingress physical ports 108. The port MAC receiver unit 120 generally implements media access control functions. The port MAC receiver unit 120 also generally interfaces the ingress portion 104 with a particular physical ingress port of the network device 100 (i.e., if the network device 100 includes a plurality of physical ingress ports, the network device 100 includes a plurality of respective port MAC receiver units 120). In another embodiment, one port MAC receiver unit 120 interfaces the ingress portion 104 with a plurality of physical ingress ports (not shown for purposes of clarity) of the network device 100.

A receive direct memory access (RxDMA) unit 124 generally writes each received packet to a memory (not shown) and outputs a corresponding indicator (e.g., a pointer) of a location of the packet in the memory. In an embodiment, the RxDMA unit 124 includes a data structure generator and a header parser. The header parser parses header information in a packet and the data structure generator generates a data structure (e.g., a packet descriptor) corresponding to a packet and includes, in the data structure, header information parsed by the header parser, in an embodiment. The data structure includes the indicator (e.g., a pointer) of the location of the packet in the memory so that additional information needed for processing can be extracted from the packet itself, if necessary, and/or so that the packet can be ultimately forwarded to a selected location once processing of the data structure is completed, in an embodiment.

A configurable core unit 128 is coupled to the RxDMA unit 124. The configurable core unit 128 is capable of being configured (e.g., in a manufacturing facility, by a user, etc.) to perform desired operations, in an embodiment, that cannot be normally performed by other units in pipeline 102 or to suitably modify data structures associated with incoming packets so that the other units in pipeline 102 can perform processing operations on packets that are different from the operations which they are normally configured to perform. The configurable core unit 128 includes a processor configured to execute machine readable instructions stored in a memory (not shown), in an embodiment. For example, instructions stored in the memory associated with the processor can be modified, deleted, overwritten, new instructions may be added, etc. In an embodiment, the configurable core unit 128 includes reconfigurable hardware such as a programmable logic device (PLD).

In an embodiment, the configurable core unit 128 is capable of being configured to modify a data structure created by a previous unit of the pipeline 102, such as the RxDMA unit 124 or another unit (not shown). In an embodiment, the configurable core unit 128 is capable of being configured to modify values in the data structure. In an embodiment, the configurable core unit 128 is capable of being configured to add fields and/or remove fields from the data structure and/or insert into a field in the data structure content that is different from the content which was intended to be inserted into the field (from the point of view of other units in the pipeline). In an embodiment, the configurable core unit 128 is capable of being configured to parse header fields that the RxDMA unit 124 or another unit (not shown) that parses header fields is not capable of parsing. For example, in an embodiment, other units (e.g., the RxDMA unit 124) of the pipeline 102 may not be capable of processing packets according to a certain network protocol. For example, a header parsing function of the pipeline 102 (e.g., implemented in the RxDMA unit 124 or another unit (not shown)) is not capable of parsing header fields specified by the certain network protocol, and thus a data structure created based on the parsing does not include information from header fields corresponding to the certain network protocol. On the other hand, the configurable core unit 128 is capable of being configured to modify the data structure based on information from header fields corresponding to the certain network protocol, in an embodiment. In other words, the configurable core unit 128 is adapted to update fields in a data structure corresponding to a packet based on header information conforming to protocols that are not known to one or more other processing stages, in such a manner that the one or more other processing stages are then able to process the packets, albeit using information that is compliant with protocols that are unknown to the one or more processing stages. Although, in an embodiment, the information is compliant with an unknown protocol, the configurable core applies the information to the data structure in a manner that appears to be consistent with a protocol that is known by a processing unit, so that the packet can be processed by the one or more other processing stages.

In an embodiment, other units of the pipeline 102 operate using the modified data structure as if the modified data structure corresponds to a network protocol (known to the other units) different than the certain network protocol (unknown to the other units). In another embodiment, other units of the pipeline 102 are configured to ignore portions of the data structure modified by the configurable core unit 128, except that one or more other configurable core units downstream in the pipeline 102 have been configured to utilize the portions of the data structure modified by the configurable core unit 128 to implement functions that the pipeline 102 had not previously been configured to implement, such as functions corresponding to the certain network protocol (unknown to the other units) or other suitable functions.

In another embodiment, a header parsing function of the pipeline 102 (e.g., implemented in the RxDMA unit 124 or another unit (not shown)) operates incorrectly due to a design error or manufacturing flaw, and thus a data structure created based on the parsing does not include correct information from header fields of a packet or is otherwise not as expected by the pipeline 102. On the other hand, the configurable core unit 128 is capable of being configured to modify the data structure, e.g., based on information from header fields, to correct for errors in the header parsing function of the pipeline 102.

In an embodiment, the data structures utilized by the pipeline 102, in addition to the fields discussed above (e.g., corresponding to header fields of packets), include fields related to configurable core units, i.e., that are utilized to affect operation of configurable core units and/or that are set by one or more configurable core units to affect other units in the pipeline 102. For example, the data structure includes one or more fields that are set by one or more configurable core units to indicate to one or more other configurable core units how to process a packet and/or which actions to take, but such fields are ignored by units in the pipeline 102 other than configurable core units, in an embodiment. In an embodiment, the data structure includes one or more fields that are set by a pipeline unit, which is not a configurable core unit, to indicate to one or more configurable core units how to process a packet and/or which actions to take, but such fields are ignored by units in the pipeline 102 other than configurable core units, in an embodiment. In an embodiment, the data structure includes one or more fields that are set by one or more configurable core units to indicate to one or more other units of the pipeline 102 (e.g., configurable core units and/or units other than configurable core units) whether a packet corresponding to the data structure should bypass the one or more other units in the pipeline 102, or pass through the one or more other units in the pipeline 102 without being processed by the one or more other units in the pipeline 102.

In some embodiments, the configurable core 128 is omitted. For example, modification of the data structure (e.g., packet descriptor) discussed above is performed by another configurable core, or is not performed at all. Rather, another configurable core may perform a different function as described below.

General hardware architectural and operational principals of a processing pipeline including a configurable core operating in conjunction with a hardware processing are illustrated with reference to a tunnel termination (TTI) classification unit 132. The TTI classification unit 132 is described solely for the purposes of illustrating functionality in accordance with a particular embodiment, but operation of configurable cores can be in conjunction with any suitable processing unit in the pipeline. The TTI classification unit 132 is coupled to the configurable core 128. The TTI classification unit 132 typically performs several defined functions, according to an embodiment. For example, the TTI classification unit 132 generally performs at least two lookup functions, in an embodiment. In a first lookup function, packets that are destined to a MAC address, VLAN pair recognized by the network device 100 are identified. This identification may be used in one or more subsequent functions or pipeline units. A second lookup function (a tunnel termination and interface assignment (TTI) lookup) is used for tunnel termination identification and interface assignment, and/or assigning a VLAN to the packet according to Layer-2 (L2) or Layer-3 (L3) header fields.

In an embodiment, the TTI lookup includes using fields of the header of the packet being processed and other information (such as the result of the first lookup) as a lookup key to retrieve data from one or more tables having table data. The table data includes indications of actions to be taken, in an embodiment. In some situations, the TTI lookup indicates that the packet is associated with one or more TTI actions, such as assigning a VLAN, assigning quality of service (QoS) parameters, assigning an egress port, etc., to the packet, in an embodiment.

As discussed above, the TTI classification unit 132 utilizes one or more tables, databases, and/or other data library maintained in one or more memory components (such as a TCAM). The one or more tables, databases, etc., are consulted to identify a table entry or database record that matches, or closely approximates, the format and structure of the ingressed packet, in an embodiment. When the TTI classification unit 132 is unable to identify a table entry or database record that matches, or closely approximates, the format and structure of the ingressed packet, the TTI classification unit 132 may take no action or take one or more default actions.

In an embodiment, one or more tables utilized by the TTI classification unit 132 include one or more fields corresponding to information related to configurable core units downstream from the TTI classification unit 132. For example, when the TTI classification unit 132 identifies a table entry, the TTI classification unit 132 may utilize such one or more fields in the table entry to set or modify a corresponding one or more fields in the data structure to affect operation of a downstream configurable core unit, in an embodiment.

In an embodiment, one or more tables utilized by the TTI classification unit 132 include one or more of a LocalUnitDefined[31:0] field, a LocalUnitDefinedUpdateMask[31:0] field, and a field to indicate whether a corresponding packet should bypass, or pass through without being processed by, one or more configurable core units of the pipeline 102. The LocalUnitDefined field is a field that corresponds to a LocalUnitDefined[31:0] field in the data structure (e.g., packet descriptor) used to communicate information from a unit which just processed the packet descriptor to the next nearest programmable core. For example, if a unit such as the TTI classification unit 132 performs several lookups based on a packet descriptor, a first lookup is used to update a first portion of the LocalUnitDefined field in the packet descriptor, a second lookup is used to update a second portion of the LocalUnitDefined in the packet descriptor, and so on, in an embodiment. The LocalUnitDefinedUpdateMask field (e.g., packet descriptor) indicates to the TTI classification unit 132 which bits from the LocalUnitDefined field in the packet descriptor are to be modified in response to a lookup. The next nearest programmable core uses the LocalUnitDefined field to decide what kind of additional actions to perform on the packet, in an embodiment. The one or more tables are capable of being changed, i.e., reconfigured, in the field, in a manufacturing facility, etc., so that the functioning of the TTI classification unit 132 can be changed with respect to modifying packet descriptor fields utilized by configurable core units in the network device 100.

In an embodiment, the TTI classification unit 132 is configured to permit a packet to bypass processing by the TTI classification unit 132 or one or more sub-units of the TTI classification unit 132. For example, if the TTI classification unit 132 performs multiple lookup operations when processing a packet, the TTI classification unit 132 is configured to permit a packet to bypass one or more of such lookup operations, in an embodiment. One or more fields of a data structure associated with a packet indicates to the TTI classification unit 132 whether the packet is to bypass processing by the TTI classification unit 132 or one or more sub-units of the TTI classification unit 132, in an embodiment. In an embodiment, such one or more fields of the data structure are set or modified by the configurable core 128.

A configurable core unit 136 is coupled to the TTI classification unit 132. The configurable core unit 136 includes the same structure, or a similar structure, as the configurable core unit 128, in an embodiment. The configurable core unit 136 is capable of being configured (e.g., in a manufacturing facility, by a user, etc.) to perform desired operations, in an embodiment. For example, in an embodiment, the configurable core unit 136 is capable of being configured to modify a data structure associated with a packet, the data structure received from the TTI classification unit 132 or another suitable upstream unit in the pipeline 102. The configurable core unit 136 then forwards the modified data structure to a next unit in the pipeline. In an embodiment, the configurable core unit 136 modifies the data structure (e.g., packet descriptor) or performs another suitable function, based on the LocalUnitDefined field in the packet descriptor that was modified by the TTI classification unit 132 or another suitable unit.

In an embodiment, the configurable core unit 136 is omitted. For example, modification of the data structure (e.g., packet descriptor) or other function performed by the configurable core unit 136 is performed by another configurable core, or is not performed at all.

An ingress policy engine 140 is coupled to the configurable core unit 136, in an embodiment. The ingress policy engine 140 generally performs flow classification. A flow corresponds to related series of packets, and may be defined in a variety of different ways. One example of a flow is defined by a MAC source address or a particular MAC destination address in a medium access control (MAC) header. In other words, in one example, all packets having a particular MAC source address correspond to a particular flow. Another example of a flow is defined by a MAC source address/destination address pair. In other words, in one example, all packets having both a particular MAC source address and a MAC destination address correspond to a particular flow.

Additionally, fields from different protocol layers may be combined to define a flow, in some embodiments.

In an embodiment, the ingress policy engine 140 includes, or is coupled to, a TCAM or other suitable memory. The ingress policy engine 140 generally uses fields of the header of the packet being processed, and other suitable information, as a key to the TCAM. An entry in the TCAM indicates a particular rule or set of one or more actions to be performed (with regard to flow measurement, VLAN assignment, egress port assignment, etc., for example). In some scenarios, at least some of the actions to be performed are to be performed by processing units downstream from the ingress policy engine 140. Thus, in some scenarios, the ingress policy engine 140 assigns attributes to the packet to indicate to downstream processing units how the packet is to be processed. In an embodiment, assigning an attribute comprises including an attribute indicator in the data structure corresponding to the packet. The ingress policy engine 140 utilizes the result of a lookup performed by the TTI classification unit 132, in an embodiment. For example, the result of the TTI classification unit 132 lookup is used as part of the key for the lookup performed by the ingress policy engine 140, in an embodiment.

In other embodiments, the ingress policy engine 140 does not utilize a TCAM. For example, a hashing technique or any other suitable technique for classifying multi-field parameters is utilized in other embodiments. Thus, in some embodiments, the TCAM of the ingress policy engine 140 is omitted.

A bridge engine 144 is coupled to the ingress policy engine 140. The bridge engine 144 includes, or is coupled to, a forwarding database (not shown) that includes MAC destination addresses and indications of the corresponding egress ports to which packets having the MAC destination addresses should be forwarded. In one embodiment, the forwarding database includes a table of MAC destination addresses and indications of the corresponding egress ports. In an embodiment, the forwarding database more generally includes both MAC source addresses and MAC destination addresses, and provides a binding of a MAC address to a port and other parameters, such as one or more of a flag indicating whether a packet is to be mirrored by the ingress portion 104 to an ingress analyzer (not shown) for further processing, a flag indicating whether a packet is to be mirrored by the egress portion 112 to an egress analyzer (not shown) for further processing, user defined bits to be used for user-defined functions, etc. These bindings are used mainly for forwarding decisions, but are for other purposes as well, such as for mirroring packets to an analyzer for further analysis, user defined functions or applications, etc. The bridge engine 144 performs MAC source address lookups and MAC destination address lookups, in some embodiments and in at least some scenarios.

In an embodiment, the bridge engine 144 generally uses Layer-2 information to determine on which port or ports a packet should be forwarded. Determination of whether, and to where a packet should be forwarded, is done by examining the MAC destination address of the packet and determining to which network segment the destination address corresponds using the forwarding database, in some instances. Also, other information is utilized as well in other embodiments and/or instances. For example, VLAN information is utilized in some embodiments and/or instances. For instance, the bridge engine 144 is capable of determining port destinations for Layer-2 multicast or broadcast packets using VLAN information, in some embodiments. The bridge engine 144 also maintains the forwarding database, in some embodiments. For instance, the bridge engine 144 learns a port to which a source MAC address of an ingressing packet corresponds by recording the port corresponding to the ingressing packet and associating the port with the source MAC address of the packet, in an embodiment. In another example, the bridge engine 144 learns a port to which a VLAN of an ingressing packet corresponds by recording the VLAN corresponding to the ingressing packet and associating the port with the VLAN of the packet, in an embodiment.

In general, the forwarding database correlates several variables useful for making forwarding decisions. The forwarding database comprises entries based upon VLAN, port, and MAC address, for instance; lookup operations based upon MAC address and VLAN are useful in bridging operations, for example. The bridge engine 144 makes forwarding decisions also using information provided by the TTI classification unit 132, in an embodiment. Thus, the forwarding database records or table entries include fields associated with one or more of a destination MAC address, a port, a VLAN, etc.

In an embodiment, the forwarding database utilized by the bridge engine 144 includes one or more of a LocalUnitDefined[31:0] field, a LocalUnitDefinedUpdateMask[31:0] field, and a field to indicate whether a corresponding packet should bypass, or pass through without being processed by, one or more configurable core units of the pipeline 102. The LocalUnitDefined field is a field that corresponds to the LocalUnitDefined field in the data structure (e.g., packet descriptor) used to communicate information from a unit which just processed the packet descriptor to the next nearest programmable core. For example, if a unit such as the bridge engine 144 performs several lookups based on a packet descriptor, a first lookup is used to update a first portion of the LocalUnitDefined field in the packet descriptor, a second lookup is used to update a second portion of the LocalUnit-Defined in the packet descriptor, and so on, in an embodiment. The LocalUnitDefinedUpdateMask field (e.g., packet descriptor) indicates to the bridge engine 144 which bits from the LocalUnitDefined field in the packet descriptor are to be modified in response to a lookup. The next nearest programmable core uses the LocalUnitDefined field to decide what kind of additional actions to perform on the packet, in an embodiment.

In an embodiment, the bridge engine 144 is configured to permit a packet to bypass processing by the bridge engine 144 or one or more sub-units of the bridge engine 144. For example, the bridge engine 144 is configured to permit a packet to bypass a forwarding database lookup, in an embodiment. One or more fields of a data structure associated with a packet indicates to the bridge engine 144 whether the packet is to bypass processing by the bridge engine 144 or one or more sub-units of the bridge engine 144, in an embodiment. In an embodiment, such one or more fields of the data structure are set or modified by the configurable core 128 and/or the configurable core 136.

A pre-egress engine 148 is coupled to the bridge engine 144. The pre-egress engine 148 consolidates decisions of previous units in the ingress portion 104 into a single decision, and updates the data structure corresponding to a packet accordingly, in an embodiment.

The egress portion 112 is coupled to the pre-egress engine 148, in an embodiment. In one embodiment and in some scenarios, the pre-egress engine 148 determines one or more physical targets corresponding to the one or more target ports to which a packet is to be forwarded. A physical target could be a physical port/device pair, a trunk, a tunnel start, a list of physical ports, etc.

A configurable core unit 152 is coupled to the pre-egress engine 148, in an embodiment. The configurable core unit 152 includes the same structure, or a similar structure, as the configurable core unit 128, in an embodiment. The configurable core unit 152 is capable of being configured (e.g., in a manufacturing facility, by a user, etc.) to perform desired operations, in an embodiment. For example, in an embodiment, the configurable core unit 152 is capable of being configured to modify a data structure associated with a packet, the data structure received from the ingress portion 104. The configurable core unit 152 then forwards the modified data structure to a next unit in the pipeline 102.

In an embodiment, the configurable core unit 152 is omitted. For example, modification of the data structure (e.g., packet descriptor) or other function performed by the configurable core unit 152 is performed by another configurable core, or is not performed at all.

A transmit queuing unit 156 is coupled to the configurable core unit 152. The transmit queuing unit 156 generally queues data structures (e.g., packet descriptors) corresponding to packets in a plurality of queues corresponding to different classes of flows and/or different physical ports, for example. In an embodiment, the transmit queuing unit 156 also generally performs rate shaping.

A transmit direct memory access (TxDMA) unit 160 is coupled to the transmit queueing unit 156. The TxDMA unit 160 generally uses data structures corresponding to packets, as described above, to identify packets to be transmitted via one or more egress ports. The TxDMA unit 160 writes identified packets to one or more transmit buffers corresponding to the one or more egress ports.

A configurable core unit 164 is coupled to the TxDMA unit 160, in an embodiment. The configurable core unit 164 includes the same structure, or a similar structure, as the configurable core unit 128, in an embodiment. The configurable core unit 164 is capable of being configured (e.g., in a manufacturing facility, by a user, etc.) to perform desired operations, in an embodiment. For example, in an embodiment, the configurable core unit 164 is capable of being configured to modify a data structure associated with a packet, the data structure received from a previous unit in the pipeline 102. The configurable core unit 164 then forwards the modified data structure to a next unit in the pipeline 102.

In an embodiment, the configurable core unit 164 is omitted. For example, modification of the data structure (e.g., packet descriptor) or other function performed by the configurable core unit 164 is performed by another configurable core, or is not performed at all.

A header alteration unit 168 is coupled to the configurable core unit 164. In some scenarios, an ingressing packet has a VLAN field and MAC field in the packet header, and in some scenarios, it is necessary to modify the VLAN field (e.g., depending upon the VLAN associated with the MAC DA) or to multicast the packet to destination devices in different VLANs. It is noted that modification of a packet header may occur upon ingress to a provider network or upon egress from the provider network. The header alteration unit 168 maintains information allowing a packet header to be appropriately manipulated to facilitate such multicast operations, in an embodiment. In some implementations, the header alteration unit 168 manipulates the packet header independently or in cooperation with other units of the egress portion 112. The header alteration unit 168 enables control of tagging for customer networks or other subnetwork implementations, in some embodiments. To support this functionality, the header alteration unit 168 is embodied in or comprises a lookup table, database, or other suitable data structure correlating packet attribute information, VLANs, VIDs, MAC addresses, and customer VLAN tagging preferences. Additionally, the header alteration unit 168 points to a tunnel start entry that provides information regarding the required external header for a packet, in some scenarios; in that regard, a tunnel start entry defines a tunnel to be used to transmit the packet across a provider network.

A configurable core unit 172 is coupled to the header alteration unit 168, in an embodiment. The configurable core unit 172 includes the same structure, or a similar structure, as the configurable core unit 128, in an embodiment. The configurable core unit 172 is capable of being configured (e.g., in a manufacturing facility, by a user, etc.) to perform desired operations, in an embodiment. For example, in an embodiment, the configurable core unit 172 is capable of being configured to modify a data structure associated with a packet, the data structure received from a previous unit in the pipeline 102. The configurable core unit 172 then forwards the modified data structure to a next unit in the pipeline 102.

In another embodiment, the configurable core unit 172 is configurable to modify packets directly, as opposed to merely modifying data structures associated with the packets. For example, the configurable core unit 172 is configurable to add encapsulation header information to a packet, in an embodiment. Another unit upstream in the pipeline 102, e.g., another configurable core unit, provides information, e.g., in a data structure corresponding to the packet, that indicates to the configurable core unit 172 that encapsulation header information should be added to the packet, in an embodiment.

As another example, the configurable core unit 172 is configurable to de-encapsulate packets, i.e., to remove encapsulation header information from a packet, in an embodiment. Another unit upstream in the pipeline 102, e.g., another configurable core unit, provides information, e.g., in a data structure corresponding to the packet, that indicates to the configurable core unit 172 that encapsulation header information should be removed from the packet, in an embodiment.

In an embodiment, the configurable core unit 172 is omitted. For example, modification of the data structure (e.g., packet descriptor), modification of the packet, or other function performed by the configurable core unit 172 is performed by another configurable core, or is not performed at all.

An egress policy engine 176 is coupled to the configurable core unit 172. The egress policy engine 176 generally performs flow classification. When the packet belongs to a recognized flow, the egress policy 176 associates the packet with the flow. For example, the egress policy engine 176 attaches a flow identifier (ID) to a packet to indicate a flow to which the packet belongs, in an embodiment. In at least some scenarios and implementations, the flow ID is removed from the packet before or upon egress from the network device 100. For example, if the network device 100 is a component of a switching system including other similar network devices (not shown), and if the packet is exiting the switching system, the flow ID is removed from the packet before or upon egress from the network device 100, in an embodiment. On the other hand, if the network device 100 is a component of a switching system including other similar network devices (not shown), and if the packet is being forwarded to another network device in the switching system, the flow ID is included in a distributed switching architecture (DSA) tag of the packet before or upon egress from the network device 100, in an embodiment.

A port MAC transmit unit 180 is coupled to the egress policy engine 176. The port MAC transmit unit 180 generally implements media access control functions and forwards packets to appropriate egress physical ports 116.

Figure 2:
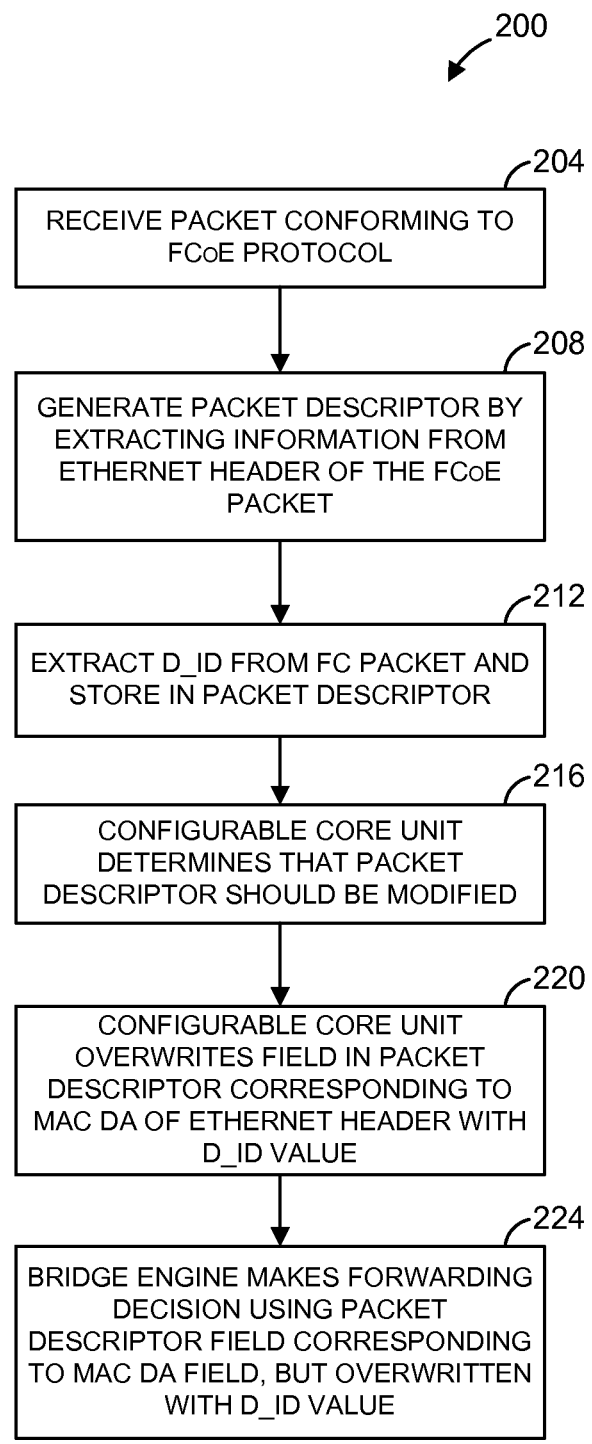
FIG. 2 is a flow diagram of an example method for processing a packet in a network device, according to an embodiment.

FIG. 2 is a flow diagram of an example method 200 for processing a packet, according to an embodiment. The method 200 is implemented by a network device, such as the network device 100 of FIG. 1. For illustrative purposes, the method 200 is discussed with reference to FIG. 1. The method 200, however, is implemented by a suitable network device other than the network device 100, in an embodiment.

Also for illustrative purposes, the method 200 is discussed with reference to an embodiment in which the pipeline 102, prior to configuration of the configurable core units, is configured to process at least packets conforming to an Ethernet protocol, but is not capable of processing packets conforming to the Fiber Channel over Ethernet (FCoE) protocol, except as treating such FCoE packets as Ethernet packets. Although operation of an embodiment of a pipeline is illustrated using an example related to FCoE, the scope of the patent is not limited to this particular application. In other embodiments, packets conforming to other suitable protocols are similarly processed.

At block 204, a packet that conforms to the Fiber Channel over Ethernet (FCoE) protocol is received at the network device 100. The FCoE packet includes a packet conforming to a fiber channel (FC) protocol (i.e., an FC packet) encapsulated in an Ethernet frame.

At block 208, the RxDMA unit 124 or another suitable unit extracts header information from the Ethernet header of the FCoE packet and stores the extracted header information in a packet descriptor (i.e., a data structure) associated with the FCoE packet. For instance, a MAC destination address (DA) is extracted from the Ethernet header of the FCoE packet and is stored in a MAC DA field of the descriptor.

At block 212, the FCoE packet is processed by the TTI classification unit 132. For instance, one or more tables of the TTI classification unit 132 are configured so that, in response to one or more lookup operations performed by the TTI classification unit 132, the TTI classification unit 132 extracts a destination identifier (D_ID) from the FC packet within the FCoE packet and stores the D_ID in a user data field of the descriptor. In an embodiment, the user data field is a field in the descriptor that can be utilized to communicate information amongst units of the pipeline when performing configurable functions. For example, a user can configure the TTI classification unit 132 to extract the D_ID from FCoE packets and store the D_ID in the user data field. In other embodiments, the user data field can be utilized to store other types of information to be communicated among units of the pipeline. Thus, for example, the TTI classification unit 132 is configurable (e.g., at least partially by modifying the one or more tables of the TTI classification unit 132, or by another suitable technique) to recognize FCoE packets and extract the D_ID from such packets, in an embodiment. For instance, in response to the one or more lookup operations, the TTI classification unit 132 stores an indicator in the descriptor (e.g., in the LocalUnitDefined field of the descriptor), the indicator signaling the configurable core unit 136 that the packet associated with the descriptor is an FCoE packet, in an embodiment. As discussed above, the one or more tables of the TTI classification unit 132 are capable of being changed, i.e., reconfigured, in the field, in a manufacturing facility, etc., so that the functioning of the TTI classification unit 132 is changed to extract the D_ID, stores the D_ID in the descriptor, and store the indicator signaling the configurable core unit 136.

At block 216, the configurable core unit 136, in response to receiving the descriptor associated with the FCoE packet, determines that the descriptor is to be modified by the configurable core unit 136. For example, the configurable core unit 136 detects the indicator in the descriptor (e.g., in the LocalUnitDefined field of the descriptor), that signals to the configurable core unit 136 that the packet associated with the descriptor is an FCoE packet. For example, the configurable core unit 136 determines that the MAC DA field in the descriptor should be overwritten by the D_ID value stored in the user data field of the descriptor. In an embodiment in which the TTI classification unit 132 stores in the descriptor an indicator signaling that the packet associated with the descriptor is an FCoE packet, the configurable core unit 136, in response to analyzing the indicator in the descriptor that signals an FCoE packet, determines that the MAC DA field in the descriptor should be overwritten by the D_ID value stored in the user data field of the descriptor.

At block 220, the configurable core unit 136, in response to the determination at block 216, retrieves the D_ID value from the user data field of the descriptor and stores the D_ID value in the MAC DA field of the descriptor (e.g., overwrites the MAC DA field with the D_ID value).

At block 224, the bridge engine 144, which is not familiar with the FCoE protocol but is capable of making forwarding decisions based on the MAC DA, processes the FCoE packet based at least on the MAC DA field of the descriptor, which was overwritten by the D_ID value. For example, the bridge engine 144 performs a lookup operation in a forwarding database based at least on the MAC DA field of the descriptor, in an embodiment. Further processing performed by the bridge engine 144 at block 224 includes determining, based on the lookup operation performed using the MAC DA field of the descriptor, one or more egress ports via which the packet is to be transmitted by the network device 100. Because of the operation performed at block 220, the bridge engine 144 makes a forwarding decision (e.g., determines the one or more egress ports via which the packet is to be transmitted) using the D_ID field of the FC packet (which was written into the MAC DA field of the descriptor) rather than using the original MAC DA field of the Ethernet header.

In an embodiment, the bridge engine 144 is not otherwise configured to utilize information from an FC packet encapsulated in an Ethernet frame to make forwarding decisions. For example, the bridge engine 144 is configured to utilize at least the MAC DA field in the descriptor (normally having the value of the MAC DA value of the Ethernet header), but not the user data field of the descriptor. Thus, if the operation of block 220 is not performed, the bridge engine 144 would utilize the MAC DA value of the Ethernet header to make a forwarding decision. However, because at block 220 the configurable core unit 136 stored in the MAC DA field of the descriptor the D_ID value from the FC packet, the bridge engine 144 is caused to utilize the D_ID value to make a forwarding decision. Thus, the bridge engine 144 makes a forwarding decision as if the FCoE packet is merely an Ethernet packet, but in fact makes the forwarding decision using information from an FC packet encapsulated in the Ethernet frame.

The FCoE packet is further processed by the pipeline 102. Similarly, other units in the pipeline 102, such as the pre-egress engine 148, the TxQ unit 156, the TxDMA unit 160, etc., are not otherwise configured to utilize information from an FC packet encapsulated in an Ethernet frame when processing a packet. Thus, these other units in the pipeline 102 process the FCoE packet as if the FCoE packet is merely an Ethernet packet, in an embodiment. For example, one or more other units in the pipeline 102 process the FCoE packet based on the MAC DA field of the descriptor and assuming that the value stored in the MAC DA field of the descriptor is the value from the MAC DA field of the Ethernet header (when in fact the D_ID value from the FC packet is stored in the MAC DA field of the descriptor).

More generally, in the scenario discussed above, the Ethernet protocol is an example of a first network communication protocol (the first protocol), and the FCoE protocol is an example of a second network communication protocol (the second protocol). In an embodiment, the one or more configurable cores permit the pipeline 102, which is adapted to process packets conforming to the first protocol, to be reconfigured to process packets conforming to the second protocol when many of the pipeline units of the network device 100 are not adapted to process packets conforming to the second protocol. For example, in an embodiment, many of the units of the pipeline 102 interpret a field of the packet descriptor as corresponding to a first packet header field specified by the first protocol. A configurable core unit, however, is configured to store in the field of the packet descriptor a value from a second packet header field specified by the second protocol. Thus, one or more units downstream from the configurable core unit that utilize the field of the descriptor when processing the packet are caused to utilize the second packet header field specified by the second protocol, but such units assume that they are using the first packet header field specified by the first protocol. Thus, one or more units downstream from the configurable core unit are caused to utilize the second packet header field specified by the second protocol when such units are not otherwise configured to utilize the second packet header field specified by the second protocol.

Figure 3:
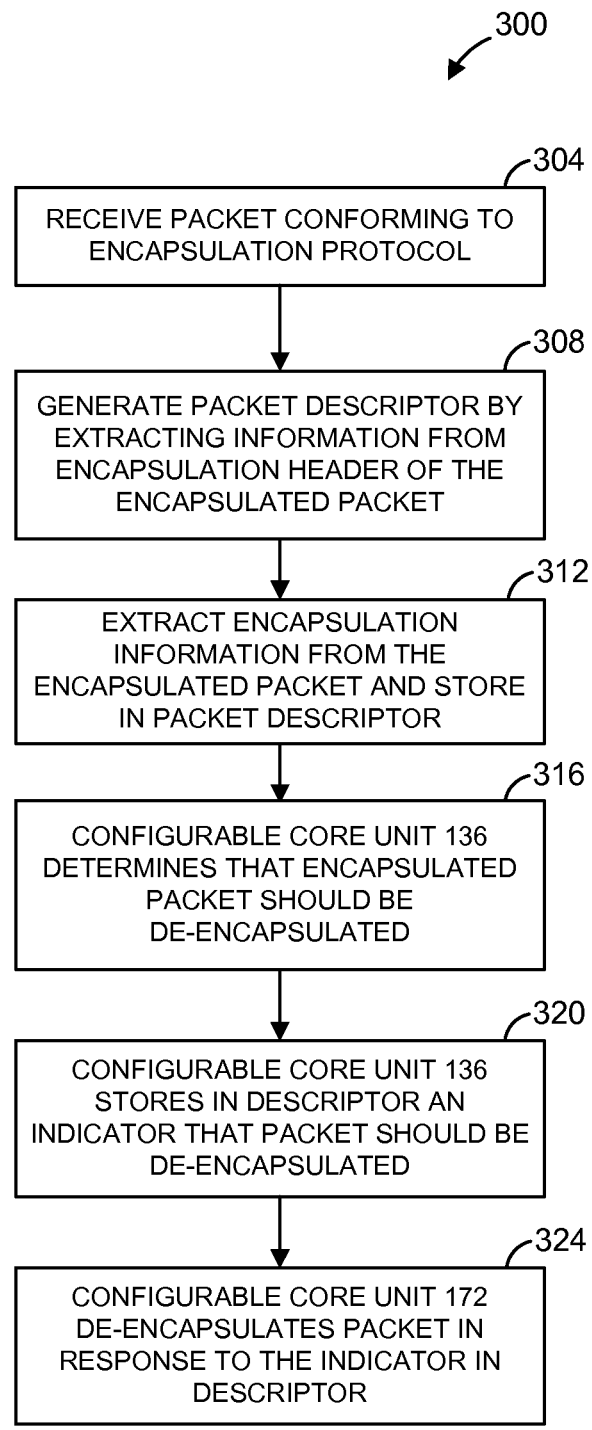
FIG. 3 is a flow diagram of another example method for processing a packet in a network device, according to an embodiment.

FIG. 3 is a flow diagram of another example method 300 for processing a packet, according to an embodiment. The method 300 is implemented by a network device, such as the network device 100 of FIG. 1. For illustrative purposes, the method 300 is discussed with reference to FIG. 1. The method 300, however, is implemented by a suitable network device other than the network device 100, in an embodiment.

Also for illustrative purposes, the method 300 is discussed with reference to an embodiment in which the pipeline 102, prior to configuration of the configurable core units is not capable of processing packets conforming to an encapsulation protocol, except as treating such packets as packets conforming to some other protocol known to units of the pipeline 102, such as an Ethernet protocol or another suitable protocol. In other embodiments, packets conforming to other suitable protocols are similarly processed.

At block 304, a packet that conforms to an encapsulation protocol is received at the network device 100. The packet conforming to the encapsulation protocol (the received packet) includes an encapsulation header and an inner packet conforming to a different protocol (referred to herein as the inner packet protocol).

At block 308, the RxDMA unit 124 or another suitable unit extracts header information from the encapsulation header and stores the extracted header information in a packet descriptor (i.e., a data structure) associated with the received packet. For instance, a MAC destination address (DA) is extracted from the encapsulation header of the received packet and is stored in a MAC DA field of the descriptor.

At block 312, the received packet is processed by the TTI classification unit 132, or another suitable processing unit. For example, the TTI classification unit 132 is configurable (e.g., at least partially by modifying the one or more tables of the TTI classification unit 132, or by another suitable technique) to perform different functions and/or to recognize different types of packets that other units of the pipeline are not capable of processing or recognizing, in an embodiment. For instance, one or more tables of the TTI classification unit 132 are configured so that, in response to one or more lookup operations performed by the TTI classification unit 132, the TTI classification unit 132 extracts one or more fields in the encapsulation header that correspond to the encapsulation protocol (referred to herein as one or more encapsulation fields) and stores the one or more encapsulation fields in one or more user data fields of the descriptor, in an embodiment. Additionally or alternatively, one or more tables of the TTI classification unit 132 are configured so that, in response to one or more lookup operations performed by the TTI classification unit 132, the TTI classification unit 132 extracts one or more fields from the inner packet (referred to herein as one or more inner packet fields) and stores the one or more encapsulation fields in the one or more user data fields of the descriptor, in an embodiment. As discussed above, the one or more tables of the TTI classification unit 132 are capable of being changed, i.e., reconfigured, in the field, in a manufacturing facility, etc., so that the functioning of the TTI classification unit 132 is changed to extract the one or more fields in the encapsulation header and/or in the inner packet, and store the one or more fields in the descriptor.

At block 316, the configurable core unit 136, in response to receiving the descriptor associated with the received packet, determines that the received packet conforms to the encapsulation protocol and that the pipeline 102 should de-encapsulate the received packet, which includes removing the encapsulation header. For instance, the configurable core unit 136 is configured to recognize information stored in the one or more user data fields of the descriptor that indicates that the received packet conforms to the encapsulation protocol and that a de-encapsulation procedure should be performed on the received packet, in an embodiment. In an embodiment, user data fields are fields in the descriptor that can be utilized to communicate information amongst units of the pipeline when performing configurable functions. For example, a user can configure the TTI classification unit 132 to store information in a user data field that indicates the received packet conforms to the encapsulation protocol and that a de-encapsulation procedure should be performed on the received packet. In an embodiment, a user can configure the TTI classification unit 132 to store information in the LocalUnitDefined field of the descriptor that indicates the received packet conforms to the encapsulation protocol and that a de-encapsulation procedure should be performed on the received packet.

At block 320, in response to determining that the de-encapsulation procedure should be performed on the received packet, the configurable core unit 136 stores an indicator in the descriptor, the indicator signaling a downstream unit of the pipeline 102 that the de-encapsulation procedure should be performed on the received packet, in an embodiment.

The packet is processed by other units of the pipeline 102 as if the packet conforms to a protocol known to the pipeline 102 until the descriptor reaches the configurable core 172. For example, the indicator in the descriptor signaling that the de-encapsulation procedure should be performed is ignored by pipeline units between the configurable core 136 and the configurable core 172.

At block 324, the configurable core 172 analyzes the descriptor and recognizes the indicator in the descriptor signaling that the de-encapsulation procedure should be performed. In response to the indicator, the configurable core 172 de-encapsulates the received packet, including removing the encapsulation header from the received packet.

The packet is processed further by subsequent units of the pipeline 102 and transmitted via an appropriate egress port.

Figure 4:
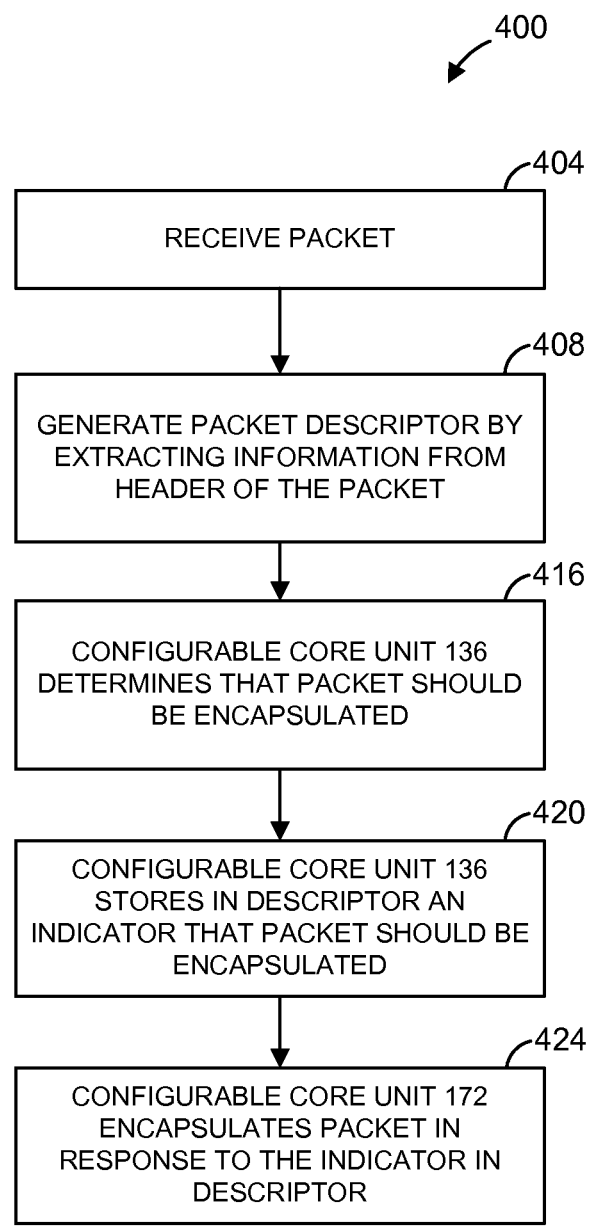
FIG. 4 is a flow diagram of another example method for processing a packet in a network device, according to an embodiment.

FIG. 4 is a flow diagram of another example method 400 for processing a packet, according to an embodiment. The method 400 is implemented by a network device, such as the network device 100 of FIG. 1. For illustrative purposes, the method 400 is discussed with reference to FIG. 1. The method 400, however, is implemented by a suitable network device other than the network device 100, in an embodiment.

Also for illustrative purposes, the method 400 is discussed with reference to an embodiment in which the pipeline 102, prior to configuration of the configurable core units is not capable of generating packets conforming to an encapsulation protocol. In other embodiments, packets conforming to other suitable protocols are similarly generated.

At block 404, a packet is received at the network device 100. At block 408, the RxDMA unit 124 or another suitable unit extracts header information from a header of the packet and stores the extracted header information in a packet descriptor (i.e., a data structure) associated with the received packet. For instance, a MAC destination address (DA) is extracted from the encapsulation header of the received packet and is stored in a MAC DA field of the descriptor.

At block 416, the configurable core unit 136, in response to receiving the descriptor associated with the received packet, determines that the received packet should be encapsulated according to the encapsulation protocol. As an example, encapsulation may be utilized to perform IP header compression such as in radio/microwave transmission where the bandwidth is limited. In such cases the MAC and/or IP headers are removed and are replaced by an identifier before transmission, in an embodiment. The receiving device analyzes the header and detects the identifier instead of the MAC and IP headers, in an embodiment. The programmable core unit 136 detects the identifier, or another suitable indicator, and determines, in response to detecting the identifier or other suitable indicator, that the packet should be encapsulated (e.g., the MAC and IP header added back to the packet) based on the identifier.

At block 420, in response to determining that the received packet should be encapsulated, the configurable core unit 136 stores an indicator in the descriptor, the indicator signaling a downstream unit of the pipeline 102 that encapsulation procedure should be performed on the received packet, in an embodiment.

The packet is processed by other units of the pipeline 102 without regard to encapsulation protocol until the descriptor reaches the configurable core 172. For example, the indicator in the descriptor signaling that the encapsulation procedure should be performed is ignored by pipeline units between the configurable core 136 and the configurable core 172.

At block 424, the configurable core 172 analyzes the descriptor and recognizes the indicator in the descriptor signaling that the encapsulation procedure should be performed. In response to the indicator, the configurable core 172 encapsulates the received packet according to the encapsulation protocol, including adding an encapsulation header to the received packet.

The packet is processed further by subsequent units of the pipeline 102 and transmitted via an appropriate egress port.

Referring again to FIG. 1, in an embodiment, the header alteration unit 168 is configurable to modify a header of a packet by adding a user-defined header to the packet. In an embodiment, the header alteration unit 168 is configurable to add a user-defined header to the packet based on one or more user-defined header tables. In an embodiment, the header alteration unit 168 utilizes a first table that corresponds to one or more user-defined headers to be added to packets. For each user-defined header, the first table includes information to be utilized by the header alteration unit 168 to create the user-defined header. For example, the first table includes information that is to be included in the user-defined header, in an embodiment. As another example, the first table includes offset information that indicates where in the packet the user-defined header is to be added, in an embodiment. As another example, the first table includes information that indicates a length of the user-defined header to be added, in an embodiment. As another example, the first table includes information for generating a checksum associated with a header of the packet after adding the user-defined header, such as one or more of a checksum type, a start location in the header for generating the checksum, an end location in the header for generating the checksum, an indication of a location at which to store the result of the checksum, etc.

In an embodiment, each entry in the first table, the entry corresponding to a user-defined header, includes an offset to a second table. The second table includes further information to be utilized by the header alteration unit 168 to create the user-defined header. In an embodiment, the second table includes information regarding combining information from the first table with additional information, such as information in the data structure corresponding to the packet to which the user-defined header is to be added. In an embodiment, each entry in the second table includes one or more of an indication of a position in the user-defined header to which the additional information corresponds, a mask for use in combining the information from the first table with additional information, etc.

In an embodiment, the first and second tables utilized by the header alteration unit 168 are capable of being changed, i.e., reconfigured, in the field, in a manufacturing facility, etc., to change how the header alteration unit 168 functions to enable the header alteration unit 168 to add user-defined headers to packets.

Figure 5:
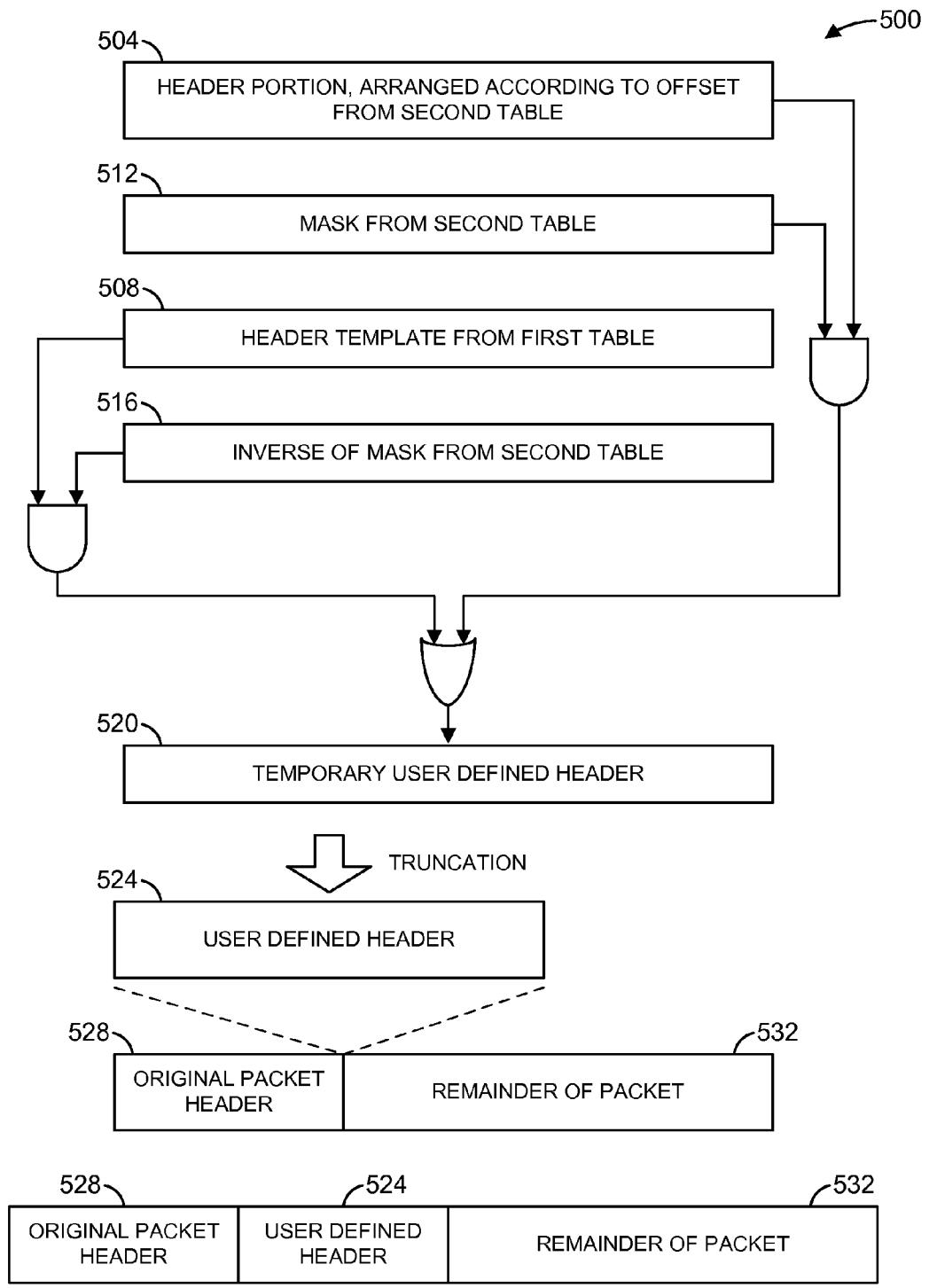
FIG. 5 is a data flow diagram of an example method for modifying a header of a packet, according to an embodiment.

FIG. 5 is a data flow diagram of an example method 500 for modifying a header, according to an embodiment. The method 500 is implemented by a unit, of a network device, configured to perform header alteration, such as the header alteration unit 168 the network device 100 of FIG. 1. For illustrative purposes, the method 500 is discussed with reference to FIG. 1. The method 500, however, is implemented by a suitable network device other than the network device 100, in an embodiment.

Also for illustrative purposes, the method 500 is discussed with reference to an embodiment in which the pipeline 102, prior to configuration of the configurable core units and the first table and the second table of the header alteration unit 168, or another suitable processing unit, is not capable of generating headers resulting from the method 500. In other embodiments, other suitable packet headers are similarly generated.

In an embodiment, a header portion 504 is received from a configurable core unit upstream from the header alteration unit 168, e.g., from the configurable core unit 164. For instance, the configurable core unit 164 modifies the packet descriptor to include the header portion 504, in an embodiment. The configurable core unit 164 modifies the packet descriptor to include an indicator that signals to the header alteration unit 168 that the header alteration unit 168 is to add to the packet a user-defined header, in an embodiment. The configurable core unit 164 then sends the packet descriptor to the header alteration unit 168.

The header alteration unit 168 determines that a user-defined header is to be added to the packet in response to receiving the descriptor. For example, the header alteration unit 168 detects an indicator in the descriptor that a user-defined header is to be added to the packet. The header alteration unit 168 then retrieves the header portion 504 from the packet descriptor and then utilizes the header portion 504 to perform a first lookup operation in the first table. An output of the first lookup operation includes a header template 508 that is to be used for generating the user-defined header, in an embodiment. The output of the first lookup operation also includes offset information that indicates where in the packet the user-defined header is to be added, in an embodiment. The output of the first lookup operation also includes information that indicates a length of the user-defined header to be added, in an embodiment. The output of the first lookup operation also includes information for generating a checksum associated with a header of the packet after adding the user-defined header.

The output of the lookup operation also includes an index into the second table, in an embodiment. The header alteration unit 168 utilizes the index to perform a second lookup operation in the second table. An output of the second lookup operation includes information regarding how to combine the header portion 504 with the header template 508, in an embodiment. For example, the output of the second lookup operation includes offset information that indicates an offset of the header portion 504 with respect to the header template 508, in an embodiment. As another example, the output of the second lookup operation includes mask information (e.g., a mask 512) corresponding to the header portion 504 and to be utilized for combining the header portion 504 with the header template 508, in an embodiment.

Referring now to FIG. 5, the header portion 504 is arranged according to offset information retrieved from the second table using the second lookup operation, and the header portion 504 and the mask 512 are combined in a first AND operation. Similarly, the header template 508 and a logical inverse of the mask 512 are combined in a second AND operation. The result of the first AND operation and the result of the second AND operation and combined in an OR operation to generate a temporary user defined header 520. The temporary user defined header 520 is truncated according to length information retrieved from the first table using the first lookup operation to generate a user defined header 524.

The user defined header 524 is then added to the packet at a position in the packet indicated by offset information retrieved from the first table using the first lookup operation. The packet to which the user defined header 524 is added includes an original packet header portion 528 and a remainder portion 532. In an embodiment, the remainder portion 532 is truncated to remove header information that is to be replaced by the user defined header 524 or otherwise omitted from the packet.

Information to be utilized for generating a checksum associated with a header of the packet after adding the user-defined header 524 is retrieved from the first table using the first lookup operation, and such information includes one or more of a checksum type, a start location in the header for generating the checksum, an end location in the header for generating the checksum, an indication of a location in the header at which to store the result of the checksum, etc. Such information is utilized by the header alteration unit 168 to generate a checksum corresponding to the packet after insertion of the user defined header 524, and the header alteration unit 168 stores the checksum in the packet.

Although FIG. 5 illustrates the user-defined header 524 being inserted between the original packet header portion 528 and a remainder portion 532, the user-defined header 524 is added in other positions in other embodiments and/or scenarios. For example, the user-defined header 524 is added to the beginning of the packet, i.e., before the original packet header portion 528, in some embodiments and/or scenarios. Insertion of the user-defined header 524 involves overwriting at least a portion of the original packet header, in an embodiment.

Figure 6:
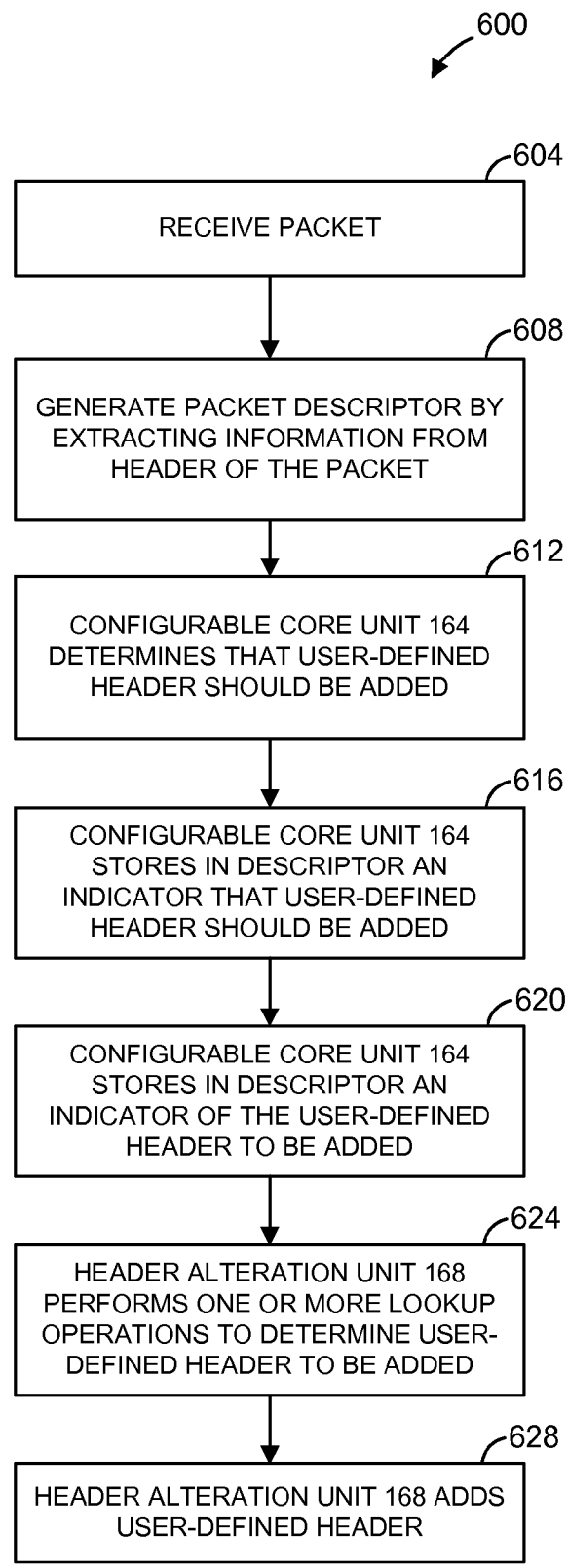
FIG. 6 is a flow diagram of another example method for processing a packet in a network device, according to an embodiment.

FIG. 6 is a flow diagram of another example method 600 for processing a packet, according to an embodiment. The method 600 is implemented by a network device, such as the network device 100 of FIG. 1. For illustrative purposes, the method 600 is discussed with reference to FIGS. 1 and 5. The method 600, however, is implemented by a suitable network device other than the network device 100 and/or with a suitable technique other than the technique corresponding to FIG. 5, in an embodiment.

Also for illustrative purposes, the method 600 is discussed with reference to an embodiment in which the pipeline 102, prior to configuration of the configurable core units and the header alteration unit 168 (e.g., configuration of one or more tables utilized by the header alteration unit 168), is not capable of generating packets with one or more particular headers added to the packets including a user-defined header.

At block 604, a packet is received at the network device 100. At block 608, the RxDMA unit 124 or another suitable unit extracts header information from a header of the packet and stores the extracted header information in a packet descriptor (i.e., a data structure) associated with the received packet. For instance, a MAC destination address (DA) is extracted from the encapsulation header of the received packet and is stored in a MAC DA field of the descriptor.

At block 612, the configurable core unit 164, in response to receiving the descriptor associated with the received packet, determines that the user-defined header should be added to the received packet. Determining that the user-defined header should be added to the received packet is based on information carried in the descriptor (such as one or more of the target port, a ProgrammableCoreDefined field, VLAN, or any other suitable field). In an embodiment, the ProgrammableCoreDefined field is a field For example, such user-defined headers can be headers corresponding to proprietary network protocols or network protocols in the process of being standardized but not yet finalized, such as the Network Virtualization using Generic Routing Encapsulation (NVGRE) protocol, the Virtual Extensible Local Area Network (VxLAN) protocol. Thus, in an embodiment in which a network switch implements the method 600 or another similar, suitable method, the network switch is capable of being configured, after manufacture for example, to transmit packets with headers corresponding to proprietary protocols or protocols not yet finalized at the time of manufacture of the switch.

At block 616, in response to determining that the user-defined header should be added to the received packet, the configurable core unit 164 modifies the descriptor to include an indicator to signal the header alteration unit 168 that a user-defined header should be added to the received packet. For example, the configurable core unit 164 modifies a field in the descriptor which indicates to the header alteration unit 168 which encapsulation the header alteration unit 168 should add to the packet, in an embodiment.

At block 620, in response to determining that the user-defined header should be added to the received packet, the configurable core unit 164 modifies the packet descriptor to include an indicator of the user-defined header to be added to the received packet.

In other embodiments, a suitable configurable core unit other than the configurable core unit 164 modifies the descriptor at blocks 616 and/or 620. In embodiments in which other units of the pipeline 102 are located between i) the configurable core unit that modifies the packet descriptor to include the indicator that a user-defined header and/or the indicator of the particular user-defined header to be added, and ii) the header alteration unit 168, the packet is processed by such other units of the pipeline 102 without regard to such indicators, in an embodiment. For example, such indicators are ignored by pipeline units between the configurable core and the header alteration unit 168.

At block 624, the header alteration unit 168 analyzes the descriptor and recognizes the indicator in the descriptor signaling that a user-defined header should be added. In response to the indicator, the header alteration unit 168 performs one or more lookup operations in one or more tables, using information from the descriptor, to determine the user-defined header to be added. For example, the header alteration unit 168 performs the first and second lookup operations using the first and second tables discussed above with respect to FIG. 5. The one or more tables (e.g., the first and second tables discussed with respect to FIG. 5) are configured, e.g., at a manufacturing facility and/or in the field, to enable the header alteration unit 168 to utilize results of the one or more lookup operations to determine the user-defined header.

At block 628, the header alteration unit 168 adds the user-defined header to the packet. In an embodiment, the header alteration unit 168 adds the user-defined header to the packet as discussed with respect to FIG. 5.

The packet is processed further by subsequent units of the pipeline 102 and transmitted via an appropriate egress port.

Figure 7:
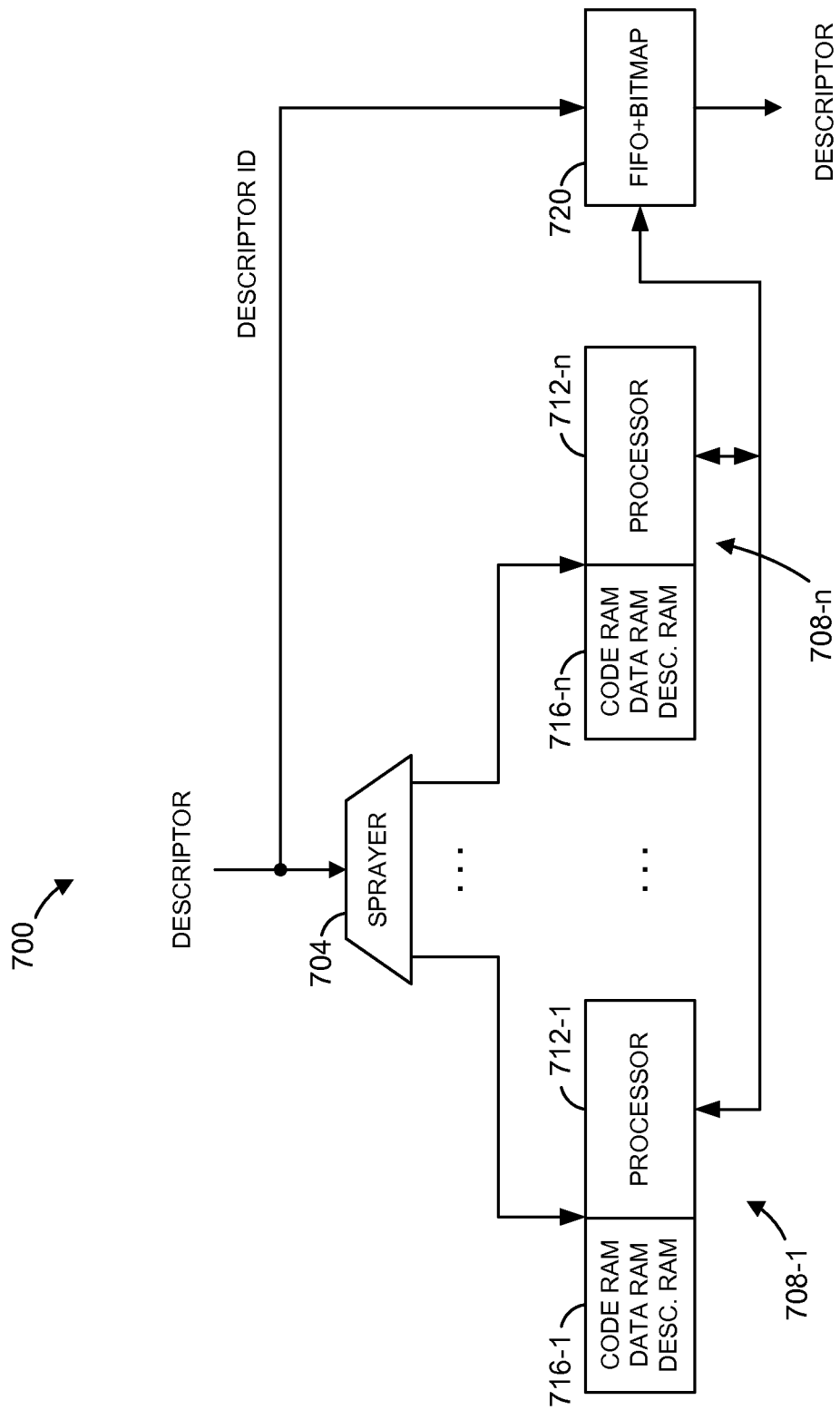
FIG. 7 is a diagram of an example configurable core unit utilized in the network device of FIG. 1, according to an embodiment.

FIG. 7 is a block diagram of an example configurable core unit 700, according to an embodiment. The configurable core unit 700 is utilized as one or more of the configurable core unit 128, the configurable core unit 136, the configurable core unit 152, the configurable core unit 164 and the configurable core unit 172 of FIG. 1, in some embodiments. In other embodiments, one or more of the configurable core units of FIG. 1 are suitable configurable cores different than the configurable core unit 700, in some embodiments. Similarly, the configurable core unit 700 is utilized in a network device other than the network device 100 of FIG. 1, in some embodiments.

The configurable core unit 700 includes a sprayer 704 configured to distribute descriptors (i.e., data structures corresponding to packets) to a plurality of processing engines 708. The plurality of processing engines 708 are configured to permit processing multiple descriptors in parallel to facilitate the ability of the configurable core unit 700 to manipulate headers at wire speed (e.g., at a speed sufficient to process packets at a rate at which the packets are received by the network switch). For example, in an embodiment, the configurable core unit 700 is utilized in a pipeline in which descriptors move through the pipeline at fixed intervals (e.g., one or more clock cycles corresponding to a clock of the pipeline). In other words, each of at least some units of the pipeline, including the configurable core unit 700, is configured to output a descriptor at a fixed interval, once primed. By utilizing the plurality of processing engines 708, which are configured to process multiple descriptors in parallel, the configurable core unit 700 is able to process packet descriptors at the rate corresponding to other units of the pipeline. In another embodiment, however, the configurable core unit 700 includes a single processing engine configured to operate at a speed sufficiently higher than the clock rate of the pipeline so that single processing engine, once primed, outputs descriptors at the clock rate of the pipeline.

Each processing engine 708 includes a processor 712 and one or more memories 716. Each processor 712 is adapted to execute machine readable instructions stored in the corresponding memory 716. In an embodiment, each memory 716 additionally stores data utilized by the processor 712, and stores one or more descriptors operated on by the processor 712. In an embodiment, each memory 716 is a single memory device. In another embodiment, each memory 716 corresponds to multiple memory devices including memory devices corresponding to i) machine readable instructions (code), ii) data utilized by the processor 712, and iii) one or more descriptors operated on by the processor 712. In another embodiment, each memory 716 corresponds to multiple memory devices including memory devices corresponding to i) machine readable instructions (code), and ii) data utilized by the processor 712 including one or more descriptors. In an embodiment, multiple processors 712 share one or memory devices (e.g., multi-port memory devices, high speed RAM devices, etc.). As just one example, if multiple processors 712 are to implement the same functionality, a single multi-port and/or high speed RAM device that stores code is shared by multiple processors 712, in an embodiment.

In an embodiment, each processor 712 comprises a micro-code engine. In other embodiments, each processor 712 comprises a suitable processor other than a micro-code engine.

The configurable core unit 700 also includes a first-in-first-out (FIFO) memory system 720.

In operation, when a descriptor is received by the configurable core unit 700, the sprayer 704 determines one of the processing engines 708 to which to send the descriptor. The sprayer 704 determines the one processing engine 708 based on determining which processing engines 708 are busy (e.g., already processing another descriptor), in an embodiment. The sprayer 704 determines the one processing engine 708 based on a port via which a packet corresponding to the descriptor was received, in an embodiment. The sprayer 704 is configurable to correspond one or more subsets of processing engines 708 with one or more ports, in an embodiment.

The sprayer 704 is also configured to assign an identifier (ID) to a descriptor, in an embodiment. The IDs assigned to descriptors permit the configurable core unit 700, in an embodiment, to output the descriptors in the order in which the descriptors were received by the configurable core unit 700. The sprayer 704 is configured to assign IDs to descriptors in a round robin manner, in an embodiment. The sprayer 704 is configured to assign IDs to descriptors in another suitable manner, in other embodiments.

When the sprayer 704 sends a descriptor to a processing engine 708, the sprayer 704 also sends a corresponding ID to the processing engine 708 and to the FIFO memory system 720. In an embodiment, the FIFO memory system 720 maintains a bitmap that indicates which ID is a first ID in the FIFO memory system 720. When the configurable core unit 700 outputs a descriptor that corresponds to the first ID, the FIFO memory system 720 modifies the bitmap to indicate that the next ID is now the first ID, in an embodiment.

Upon a processing engine 708 receiving a descriptor, the configurable core unit 700 is configured to mark the processing engine 708 as busy. The processor 712 then processes the descriptor according to code and data stored in the memory 716. The code and/or data stored in the memory 716 can be changed, i.e., reconfigured, in the field, in a manufacturing facility, etc., to change the functioning of the configurable core unit 700.

When the processor 712 is finished processing the descriptor, the processor 712 sends a finished message to the FIFO memory system 720 indicating that processing of the descriptor is completed, in an embodiment. The finished message includes the ID corresponding to the descriptor, in an embodiment.

Upon receiving a finished message, the FIFO memory system 720 determines whether the ID in the finished message corresponds to the first ID in the FIFO memory system 720, e.g., as indicated by the bitmap discussed above. If the ID in the finished message does not correspond to the first ID in the FIFO memory system 720, the FIFO memory system 720 waits until the ID in the finished message becomes the first ID in the FIFO memory system 720. When it is determined that the ID in the finished message corresponds to the first ID in the FIFO memory system 720, the FIFO memory system 720 sends an acknowledgment message to the processing engine 708. In response to the acknowledgment message, the processing engine 708 transmits the descriptor to the FIFO memory system 720 and the FIFO memory system 720 outputs the descriptor, e.g., to a next unit in the processing pipeline, in an embodiment. In another embodiment, in response to the acknowledgment message, the processing engine 708 outputs the descriptor to a next unit in the processing pipeline. Upon a processing engine 708 transmitting a descriptor to the FIFO memory system 720, the configurable core unit 700 is configured to mark the processing engine 708 as not busy.

In an embodiment, one or more processing engines 708 can be put into a low-power mode and marked as busy to conserve power. In an embodiment, one or more processing engines 708 can be clocked at a slower clock rate to conserve power. For example, the configurable core unit 700 is adapted to change clock speeds of one or more clocks provided to one or more processing engines 708 to affect power consumption of the configurable core unit 700, in an embodiment.

It is noted that each of the blocks of the figures may be implemented using hardware, a processor executing firmware instructions, a processor executing software instructions, or any combination thereof. When a block is implemented at least partially using a processor that executes software instructions, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software instructions may be delivered to a user or a system via any known or desired delivery method including, for example, on a computer readable disk or other transportable computer storage mechanism or via communication media. When implemented in hardware, the hardware may comprise one or more of discrete components, an integrated circuit, an application-specific integrated circuit (ASIC), etc. Referring to FIG. 1, in accordance with an embodiment, the pipeline 102 is implemented on a single integrated circuit (IC). In other embodiments, the pipeline 102 is implemented on a plurality of ICs. For example, in one embodiment, the ingress portion 104 is implemented on a first IC and the egress portion is implemented on a second IC, according to an embodiment.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A network device, comprising:
a plurality of ports configured to receive and to transmit packets on a network;
a packet processing pipeline comprising a plurality of hardware stages including a first hardware stage and a second hardware stage, wherein the first hardware stage is configured to extract first data from first header information in a received packet and output a data structure comprising a field that includes the first data, wherein the first header information conforms to a first communication protocol, and the data structure is associated with the packet;
a configurable processor coupled to the packet processing pipeline, wherein the configurable processor is configured to modify the data structure to generate a modified data structure including overwriting the field in the data structure with second data extracted from second header information in the received packet, wherein the second header information conforms to a second communication protocol that is not recognized by the first hardware stage and the second hardware stage of the packet processing pipeline; and
wherein the second hardware stage is configured to perform a packet processing operation on the data structure using the data in the field of the data structure and receives the modified data structure from the configurable processor such that the second hardware stage uses the second data extracted from second header information that conforms to the second communication protocol that is not recognized by the second hardware stage.

2. A network device according to claim 1, wherein the field corresponds to a destination address extracted from the first header information of the packet that conforms to the first communication protocol;
wherein the second hardware stage is configured to determine a port via which the packet is to be transmitted using information contained in the field; and
wherein the configurable processor is configured to overwrite the field in the data structure, after the data structure is output by the first hardware stage and prior to passing the data structure to the second hardware stage, so that the field no long includes the destination address extracted from the first header information of the packet that conforms to the first communication protocol.

3. A network device according to claim 1, wherein:
the field is a first field;
the configurable processor is configured to overwrite the first field with data from a second field in the data structure, the second field storing the second data extracted from the second header information in the received packet.

4. A network device according to claim 3, wherein the packet processing pipeline comprises a third hardware stage configured to extract the second data from the second header information in the received packet and to store the second data in the second field in the data structure.

5. A network device according to claim 3, wherein the packet includes an inner packet that conforms to the second communication protocol, and wherein the second data is extracted from the inner packet.

6. A network device according to claim 1, wherein the configurable processor is configured to execute machine readable instructions.

7. A network device according to claim 1, wherein the configurable processor comprises one or more microcode engines.

8. A network device according to claim 1, wherein the configurable processor comprises a programmable logic device.

9. A method, comprising:
receiving a packet via a port of a network switching device;
processing the packet with a packet processing pipeline comprising a plurality of hardware stages including at least a first stage, a second stage, and a configurable processor, including:

extracting, with the first stage, first data from first header information in the packet, wherein the first header information conforms to a first communication protocol, outputting, with the first stage, a data structure comprising a field that includes the first data extracted from the first header information of the packet, wherein the data structure is associated with the packet, modifying, with the configurable processor, the field in the data structure output by the first stage to generate a modified data structure, including overwriting the first data in the field of the data structure with second data extracted from second header information in the received packet, wherein the second header information conforms to a second communication protocol that is not recognized by the first stage and the second stage of the packet processing pipeline, and passing the modified data structure to the second stage so that the second stage performs a packet processing operation on the data structure using the field modified by the configurable processor and so that the second hardware stage uses the second data extracted from second header information that conforms to the second communication protocol that is not recognized by the second hardware stage.

10. A method according to claim 9, wherein processing the packet comprises processing a packet descriptor corresponding to the packet.

11. A method according to claim 10, wherein:
outputting the data structure comprises outputting the packet descriptor corresponding to the packet, wherein the packet descriptor output by the first stage includes, in the field, the first data extracted from the first header information in the received packet; and modifying the field in the data structure comprises modifying the field in the packet descriptor so that the first data in the field of the data structure is overwritten with second data extracted from second header information in the received packet.

12. A method according to claim 9, wherein the field is a first field;
wherein modifying, with the configurable processor, the first field comprises modifying overwriting the first field in the data structure with the second data stored in a second field of the data structure.

13. A method according to claim 12,
wherein performing the packet processing operation on the data structure using the first field modified by the configurable processor comprises determining a port via which the packet is to be transmitted based on the first field modified by the configurable processor.

14. A method according to claim 12, further comprising extracting the second field from an inner packet included in packet, wherein the inner packet conforms to the second communication protocol.

15. A method according to claim 9, wherein the first data is a destination address;
wherein modifying the field in the data structure comprises modifying the destination address;
wherein the method further comprises performing the packet processing operation on the data structure using the destination field modified by the configurable processor.

16. A method according to claim 13, wherein the destination address is a first destination address and the second data corresponds to a second destination address;
wherein the method further comprises extracting the second destination address from the packet;
wherein modifying the field in the data structure comprises overwriting at least a portion of the first destination address with at least a portion of the second destination address.

* * * * *